Feb. 10, 1925.
H. C. SPENCER
1,525,696
EDUCATIONAL DEVICE TO ASSIST AND ACCELERATE MEMORIZATION
Filed Jan. 15, 1924
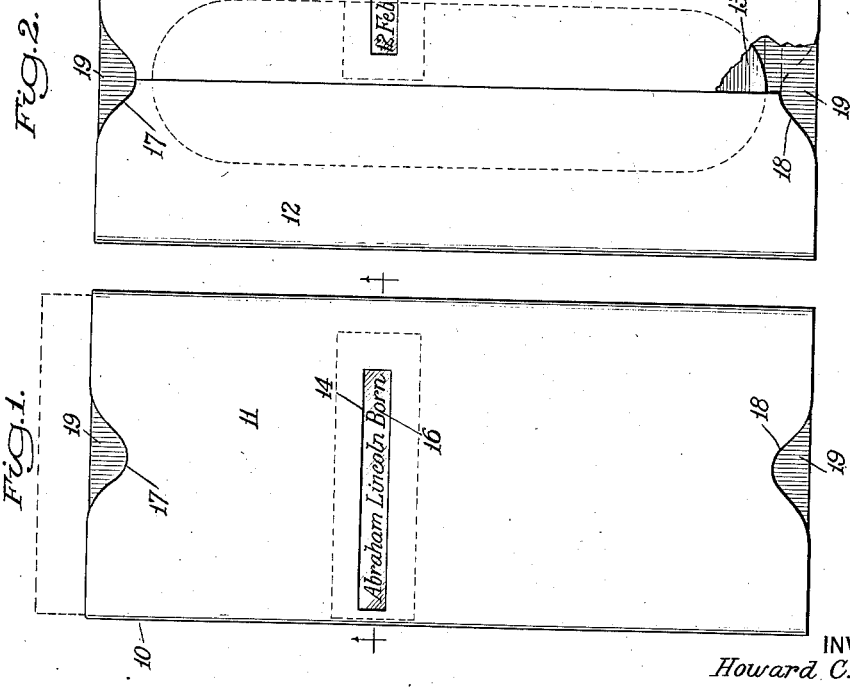
INVENTOR
Howard C. Spencer
BY
ATTORNEYS Patented Feb. 10, 1925.

1,525,696

UNITED STATES PATENT OFFICE.

HOWARD C. SPENCER, OF ROCHESTER, NEW YORK.

EDUCATIONAL DEVICE TO ASSIST AND ACCELERATE MEMORIZATION.

Application filed January 15, 1924. Serial No. 686,314.

*To all whom it may concern:*

Be it known that I, HOWARD C. SPENCER, a citizen of the United States of America, and a resident of the city of Rochester, county of Monroe, and State of New York, have invented certain new and useful Improvements in Educational Devices to Assist and Accelerate Memorization, of which the following is a specification.

This invention relates to an educational device the primary purpose of which is to aid in the memorization in minimum time of reading material which is compact, discrete and discontinuous. General objects of the invention are to provide an educational device of unlimited scope and flexibility of use, having a minimum of mechanical complexity and which will encourage interest in studying related matter comprising the subjects and keys or answers which are being memorized, and to make the device more or less fascinating to the user. Specific objects of the invention are to make the device suitable for the study of foreign-language vocabularies, history dates, formulas in mathematics, physics, chemistry, astronomy, engineering, or other arts or sciences, shorthand word-signs, etc., respectively arranged in one column, with a corresponding column of the equivalents or related subjects parallel to such column, also to make the device suitable for use as a pocket dictionary, or as a memory cross-tester in study or review. A more specific object of the present invention is to eliminate the confusion resulting from simultaneous observation of several items and to make it necessary for the user of the device to exert the effort which is required in turning over the device to expose both of the faces thereof for the study of the subjects in one column at one face, and of the key in another column at the other face, with the result of encouraging interest and rapid learning.

These being some of the objects of the present invention, the same consists of certain features of construction and combinations of parts to be hereinafter described and then claimed with reference to the accompanying drawings, illustrating the preferred embodiment of the invention, and in which:—

Fig. 1 is a face view of the device;

Fig. 2 is a rear view.

Fig. 3 is an enlarged transverse section through the sight-apertures;

Fig. 4 is a view showing a sheet, which may be folded to form a slide, unfolded so as to display a column of subject matter and its key, the line which the fold is to take being shown as dotted; and Fig. 5 is an end view of a series of inscribed or printed sheets nested to form a slide.

Referring to the drawings, the cover, case or envelope 10 of the educational device may be composed of suitable opaque material, preferably of cardboard, so folded as to provide a front wall 11 and a rear wall 12. The edges of the piece from which the envelope is formed may be brought together to just meet, and be secured together by a strip of cardboard or other material 13, which is pasted to the inner surfaces of the edge portions so as to extend longitudinally thereof, or the edges of the piece of material may overlap and be fastened together. The ends of the envelope are both preferably left open and between the two openings $10^a$, $10^b$, transverse sight-apertures 14 and 15, parallel with the ends of the envelope, are formed respectively in the front wall 11 and the rear wall 12 of the envelope. Panes 16 of suitable transparent protecting material may, if desired, be secured to the inner surface of the envelope 10 to extend over the sight apertures 14, 15.

Notches 17, 18 are preferably formed in the open ends $10^a$, $10^b$ of the envelope 10 to facilitate access to a slide—preferably of the same length as the envelope—which is inserted through one of the said open ends of the envelope, such slide being preferably composed of a series or plurality of longitudinally folded sheets 19, 20 of suitable flexible material, as, for example, paper. Each sheet 19, 20, if folded, would have a longitudinal fold 21, and when the slide is composed of such folded sheets they are preferably nested together, fold within fold. The sheets may have the matter to appear thereon printed on them before they are folded at the fold-line, shown dotted in Fig. 4, or, the sheets may be ruled, if the student or other person who makes use of the device wishes to first write out the various items of the subject or subject matters and keys and then fold the sheets. In some cases ordinary strips of cardboard or other suitable material may be used in place of the folded sheets, the items of the subject matter appearing on one face and the keys on the other face of such strips. In that case only one strip at a time can be used in the envelope. Also, a single folded sheet, in place of several of them nested together, may be employed to constitute a slide, all depending upon the scope of the subject matters to be covered. A single sheet of paper when folded is sufficiently stiff to serve as a slide.

When folded sheets such as 19, 20, are to be used, each folded sheet will have on one outer face a column 22 of different subject matters, or different items of the same subject matter, printed thereon, or, preferably, written thereon by the student, who, rather than a printer or publisher, determines just what matter is to appear on the sheet. Each item or unit of the column 22 of subject matter preferably reads from a point adjacent the fold to the right; and the other outer face of the folded sheet will have printed or written thereon a parallel column 23 of different keys to the corresponding items of the subject, and they read toward the fold which is parallel with the columns. In the columns the items of the subject matter and the keys will run in parallel lines.

While it is preferable that the columns of items of subject matter and keys be directly adjacent and at opposite sides of the fold, 21 so as to face away from each other, it is clear that this is not necessarily the case, but is especially desirable where sheets which are to be folded are ruled and are blank so that one may write the matter desired thereon; this is also desirable if the folded sheets are to be nested. Preferably the sight-apertures 14, 15 are located directly opposite, or in registry with, each other, and preferably each separate subject matter such as 24 has its corresponding key 25 arranged so that they appear back to back on the slide or folded sheet, that is in direct opposition, but it is obvious that in some cases it may be desirable to have the apertures offset from each other, in which case a given subject matter and its corresponding key would also be offset so that they are in cooperative relation when exposed through the cooperating sight-apertures.

Supposing one is making use of the device to study the matter displayed on the sheet shown in Fig. 4, and the units or items of the subject are to be considered and memorized together with the items of the corresponding keys in succession, the slide in the envelope is then longitudinally shifted to successively bring the various items of the subject opposite the sight-aperture 14, and simultaneously with the appearance of a given item through said aperture, the key corresponding or bearing a constant relation thereto will be visible through the other sight-aperture 15, but the one using the device will have to turn the envelope or case over in order to see what key has appeared cooperatively with the given subject displayed. The user having memorized the given subject-item and its key then shifts the slide to another subject-item when its corresponding key will also be displayed and the user then memorizes that subject-item and the key. This operation is continued until the user memorizes so much of the subject matter and key as is necessary. If the subject matter and keys on one folded sheet have been learned then that sheet may be inserted within the folds of the other sheets, and the outermost of these sheets will then expose its particular column of subject matter and keys thereto. For study or review either column may be viewed and the memory called upon for the equivalent contained in the other column; this provides a double cross-test of memory and of the mastery of the material studied.

As the material of the case or envelope 10 is opaque the unapertured portions thereof serve as blinds to hide all matter not displayed through the two apertures 14, 15. A reference to but one subject-item and key shown will suffice to illustrate any others. If one is studying ancient history, for example, the subject-item may be the words "Rome founded;" the conjointly appearing key, or answer, would be "753 BC," or vice versa. It will be noted that each subject-matter item and its key or answer, with respect to its corresponding sight aperture, is less than the height and less than the length of the aperture, or at least these proportions are such that each subject-item and its key is easily readable.

The outstanding advantage of memorizing by these means, over the customary way of learning from a list in a test book, note book, or dictionary, is that it presents item by item the matter to be learned or reviewed, with the key completely hidden yet instantly accessible during the process of memorization or review by merely turning the device over. This effect is ordinarily partially gained by the student when he covers the key column in his book with a card or blotter (for example in learning a French vocabulary) and, after trying to recall the equivalent of each English word in turn, uncovers the French equivalent to verify his recollection or guess, or the reverse process of learning the English from the French is employed. Any one who has tried this, however, will realize how annoyingly often the card or blotter is shifted too far, or blows away, or an irregularity in the column exposes too many words at once. Of course one can and very often does learn from two columns both exposed to the eye at one time, but then it is very difficult to control the eye so that the key is not seen beforehand, and if the columns be separate, then, when the key is consulted about one word, the following two or three are almost unconsciously perceived. When the words are printed side by side it is all too easy to glance over the key before giving the memory a fair test.

Stress is laid on the simplicity of the improved device and its adaptability to material of various kinds—dates, formulas, etc., as well as vocabularies—to indicate that it is intended primarily for the student or other user, who writes in any information of his own selection that he desires to memorize in minimum time; and to stress the preferred method of use, viz:

1. The user first must write in the material to be memorized, thus taking advantage of this powerful aid to concentration of attention and to memory.

2. The user rereads material written down to ensure accurate copying, thus further impressing material on the memory.

3. By then using the device the user acquires and tests his present mastery of the material; in subsequent review he tests his ultimate mastery.

4. By carrying the device with him, as he may easily do in view of its size, the user has the material available for study or review at any time or in odd moments.

5. By reason of its construction the user is assisted and enabled to concentrate his attention upon one item at a time for as long as and whenever he desires.

The wide and extensive range of the present invention is obvious so far as the scope, variety, and practicability of the subjects which can be covered are concerned; and the invention is of course not limited to the study of any particular subject, although each slide or sheet will probably be confined to a given line of study; nor is it limited as to details except as expressed in the claims.

What I claim as new and desire to secure by Letters Patent of the United States is:

1. An educational device to assist and accelerate memorization, which comprises an opaque envelope, open at one edge, and provided with only two sight apertures arranged in cooperating relation in its opposite faces, and a slide in the envelope bearing on one face a column of different subjects and on the other face a column of different keys to the corresponding subjects, each item of the different subjects and its corresponding key being in cooperating opposition on the slide, and the said sight apertures being narrow and substantially the same in height, and relatively long, and extending transversely of the envelope and parallel with said edge opening, for simultaneously uncovering correspondingly sized transverse areas of the opposite surfaces of the slide, so that one may read co-related legible matter which may appear at the opposite surfaces of the slide.

2. An educational device to assist and accelerate memorization, which comprises an opaque envelope, open at one edge, and provided with only two sight apertures arranged in cooperating relation in its opposite faces, and a slide which is fitted to the envelope and is movable through said edge-opening, the said slide bearing on one face a column of different subjects and on the other face a column of different keys to the corresponding subjects, each item of the different subjects and its corresponding key being in cooperating opposition on the slide, and the said sight apertures being narrow and substantially the same in height, and relatively long, and extending transversely of the envelope and the direction of movement of the slide, for simultaneously uncovering correspondingly sized transverse areas of the opposite surfaces of the slide, so that one may read co-related legible matter which may appear at the opposite surfaces of the slide.

3. An educational device to assist and accelerate memorization, comprising the combination of an opaque envelope provided with registering sight-apertures in its opposite faces, and a slide in the envelope bearing on one face a column of different subjects and on the other face a column of different keys to the corresponding subjects, each item of the different subjects and its corresponding key being in direct opposition on the slide, so as to appear simultaneously at said apertures, and the unapertured portions of the envelope serving as blinds to the subjects and keys which are beyond the sight-apertures.

4. An educational device to assist and accelerate memorization, comprising the combination of an opaque envelope provided with cooperating sight-apertures in its opposite faces, and a slide in the envelope bearing on one face a column of different subjects and on the other face a column of different keys to the corresponding subjects, each item of the different subjects and its corresponding key being in cooperating opposition on the slide, so as to appear simultaneously at said apertures, and the unapertured portions of the envelope serving as blinds to the subjects and key which are beyond the sight-apertures.

5. An educational device to assist and accelerate memorization, comprising the combination of an opaque envelope provided with cooperating sight-apertures in its opposite faces, and a slide in the envelope, consisting of a folded sheet having on its outer surface, at one side of the fold, a column of different subjects, and on the same surface, at the other side of the fold, a column of different keys to the corresponding subjects, each item of the different subjects and its corresponding key being arranged in cooperating relation for simultaneous appearance at the said apertures.

6. A folded sheet having on its outer surface, at one side of the fold, a column of different subjects and on the same surface, at the other side of the fold, a column of different keys to the corresponding subjects, each item of the different subjects and its corresponding key being in directly opposite position on the folded sheet, in combination with an envelope provided with registering sight apertures in its opposite faces, and within which said folded sheet is fitted to slide.

7. A folded sheet having on its outer surface, at one side of the fold, a column of different subjects and on the same surface, at the other side of the fold, a column of different keys to the corresponding subjects, each item of the different subjects and its corresponding key being in conjointly readable relation on the folded sheet, in combination with an envelope provided with cooperating sight apertures in its opposite faces, and within which said folded sheet is fitted to slide.

8. An educational device to assist and accelerate memorization, comprising the combination of a series of separate folded sheets, nested together, and each folded sheet having on its outer surface, at one side of the fold, a column of different subjects and on the same surface, at the other side of the fold, a column of different keys to the corresponding subjects, each item of the different subjects and its corresponding key being arranged in cooperating relation, and blinds for all but one item at a time of the different subjects on the outer sheet and its cooperating or corresponding key.

HOWARD C. SPENCER.